United States Patent
Tewari et al.

(10) Patent No.: US 11,005,857 B2
(45) Date of Patent: May 11, 2021

(54) SYSTEMS AND METHODS FOR SECURING INDUSTRIAL DATA STREAMS WITH A FOG ROOT OF TRUST

(71) Applicant: Nebbiolo Technologies, Inc., Milpitas, CA (US)

(72) Inventors: Ruchir Tewari, Mountain View, CA (US); Thushar Gowda, Pleasanton, CA (US); Pankaj Bhagra, Fremont, CA (US); Thiru Narayanan, Fremont, CA (US); Palani Chinnakannan, San Jose, CA (US)

(73) Assignee: NEBBIOLO TECHNOLOGIES, INC., Milpitas, CA (US)

( * ) Notice: Subject to any disclaimer, the term of this patent is extended or adjusted under 35 U.S.C. 154(b) by 192 days.

(21) Appl. No.: 16/169,935

(22) Filed: Oct. 24, 2018

(65) Prior Publication Data

US 2020/0137078 A1    Apr. 30, 2020

(51) Int. Cl.
*H04L 29/06* (2006.01)
*H04L 9/08* (2006.01)
*H04L 9/32* (2006.01)

(52) U.S. Cl.
CPC .......... *H04L 63/126* (2013.01); *H04L 9/0877* (2013.01); *H04L 9/3213* (2013.01); *H04L 9/3234* (2013.01); *H04L 9/3297* (2013.01)

(58) Field of Classification Search
CPC ... H04L 63/126; H04L 9/0877; H04L 9/3297; H04L 9/3234; H04L 9/3213; H04L 63/0823; H04L 63/0846; H04L 63/101; H04L 63/108; H04L 63/0876; H04L 63/0428; H04L 9/3247; H04L 9/0897
USPC ........................................................ 713/171
See application file for complete search history.

(56) References Cited

U.S. PATENT DOCUMENTS

| | | | | |
|---|---|---|---|---|
| 2017/0126647 A1* | 5/2017 | Zhang | ............... | H04L 63/126 |
| 2017/0302663 A1* | 10/2017 | Nainar | ............... | H04L 63/123 |
| 2019/0238510 A1* | 8/2019 | Li | ............... | H04L 63/0428 |
| 2020/0067926 A1* | 2/2020 | Smith | ............... | H04W 4/38 |

\* cited by examiner

*Primary Examiner* — Mohammad W Reza
(74) *Attorney, Agent, or Firm* — Barry Choobin; Patent 360LLC

(57) ABSTRACT

Systems and methods for security of industrial data streams are provided herein. Methods according to various embodiments include provisioning a fogNode that is communicatively coupled with a fog cloud manager through a forwarder of the fogNode and providing a fogLet within the fogNode, the fogLet communicating with a plurality of operational technology devices. Embodiments include providing fogLet identification information using hardware root of trust of the fogNode, the hardware root of trust of the fogNode being a Trusted Platform Module (TPM) of the fogNode. Embodiments further comprise communicating operational device authentication information with fogLet identification information to a third party tenant application, the third party tenant application validating industrial data streams from the operational technology devices by communicating the operational device authentication information with the fogLet identification information to a third party cloud application.

14 Claims, 6 Drawing Sheets

SYSTEMS AND METHODS FOR SECURING INDUSTRIAL DATA STREAMS WITH A FOG ROOT OF TRUST

CROSS-REFERENCE TO RELATED APPLICATIONS

This patent application is related to U.S. patent application Ser. No. 15/468,004, filed Mar. 23, 2017, titled "Fog Computing Facilitated Flexible Factory," U.S. patent application Ser. No. 15/785,290, filed Oct. 16, 2017, titled "Enterprise Grade Security for Integrating Multiple Domains with a Public Cloud," and U.S. patent application Ser. No. 15/783,998, filed Oct. 13, 2017, titled "Adaptive Scheduling for Edge Devices and Networks." All of the aforementioned disclosures are hereby incorporated by reference herein in their entirety including all references and appendices cited therein.

FIELD OF INVENTION

The present invention pertains to data analytics and a security service for industrial data streams arising from industrial applications and devices. In particular, but not by way of limitation, the present technology provides data analytics security for industrial automation and the Industrial Internet of Things (IIoT).

SUMMARY

In exemplary embodiments the present technology includes a method for security of industrial data streams arising from industrial applications and devices, comprising: (a) provisioning a fogNode that is communicatively coupled with a fog cloud manager through a forwarder of the fogNode; (b) providing a fogLet within the fogNode, the fogLet communicating with a plurality of operational technology devices; (c) providing fogLet identification information using a root of trust of the fogNode, the root of trust of the fogNode being located in the fogNode; (d) providing fogLet encryption information using the root of trust of the fogNode; (e) communicating the fogLet identification information and the fogLet encryption information to the fog cloud manager; (f) transferring the fogLet identification information and the fogLet encryption information to a third party cloud application for validation of industrial data streams from the plurality of operational technology devices; (g) receiving operational device authentication information from a third party tenant application, the third party tenant application communicating with the plurality of operational technology devices; (h) providing the operational device authentication information with fogLet identification information using the root of trust of the fogNode; and (i) communicating the operational device authentication information with the fogLet identification information to the third party tenant application, the third party tenant application communicating the operational device authentication information with the fogLet identification information to the third party cloud application, the third party cloud application validating the industrial data streams from the plurality of operational technology devices using the operational device authentication information and the fogLet identification information.

In various embodiments the root of trust of the fogNode is a hardware root of trust and the hardware root of trust is a Trusted Platform Module of the fogNode.

In some embodiments the fogLet identification information using the root of trust of the fogNode comprises a time limited, client server specific signed token. In some instances the validation of the industrial data streams from the plurality of operational technology devices comprises validation of the time limited, client server specific signed token by a token validator of the fog cloud manager.

In various embodiments the fogLet identification information using the root of trust of the fogNode comprises a first time limited, client server specific signed identity token, the identity token comprising fogLet identification information for the validating of the industrial data streams from the plurality of operational technology devices; and a second time limited, client server specific signed access control token, the access control token comprising a timestamp and metadata attributes. In some instances, the validation of the industrial data streams from the plurality of operational technology devices comprises validation of the first time limited, client server specific signed identity token and the second time limited, client server specific signed access control token by a token validator of the fog cloud manager.

In exemplary embodiments the present technology includes a system for security of industrial data streams arising from industrial applications and devices, comprising: a fog federation comprising at least one fogNode, the at least one fogNode comprising at least one fogLet, the at least one fogLet coupled, using a network, with one or more edge devices, the one or more edge devices generating industrial data streams; and a fog system manager coupled, using a network, with the fog federation, the fog system manager validating the industrial data streams of the one or more edge devices using a root of trust of the fog federation, the root of trust of the fog federation being located in the fog federation.

In various embodiments the root of trust of the fog federation is at least one of Platform Module (TPM), a Trusted Execution Environment (TEE), and key management (KM) located in the fog federation.

In some embodiments the root of trust of the fog federation is a hardware root of trust, the hardware root of trust being a Trusted Platform Module located in the at least one fogLet.

In exemplary embodiments, the present technology includes a system for security of industrial data streams arising from industrial applications and devices, comprising: a fogNode comprising at least one fogLet, the at least one fogLet coupled, using a network, with one or more operational technology devices, the one or more operational technology devices generating industrial data streams; and a fog system manager coupled, using a network, with the a fogNode, the fog system manager validating the industrial data streams of the one or more operational technology devices using a root of trust of the fogNode, the root of trust of the fogNode being located in the fogNode.

In some embodiments the root of trust of the fogNode is a hardware root of trust, the hardware root of trust being a Trusted Platform Module of the fogNode.

In various embodiments the root of trust of the fogNode is a hardware root of trust, the hardware root of trust being a Trusted Platform Module located in the fogLet.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
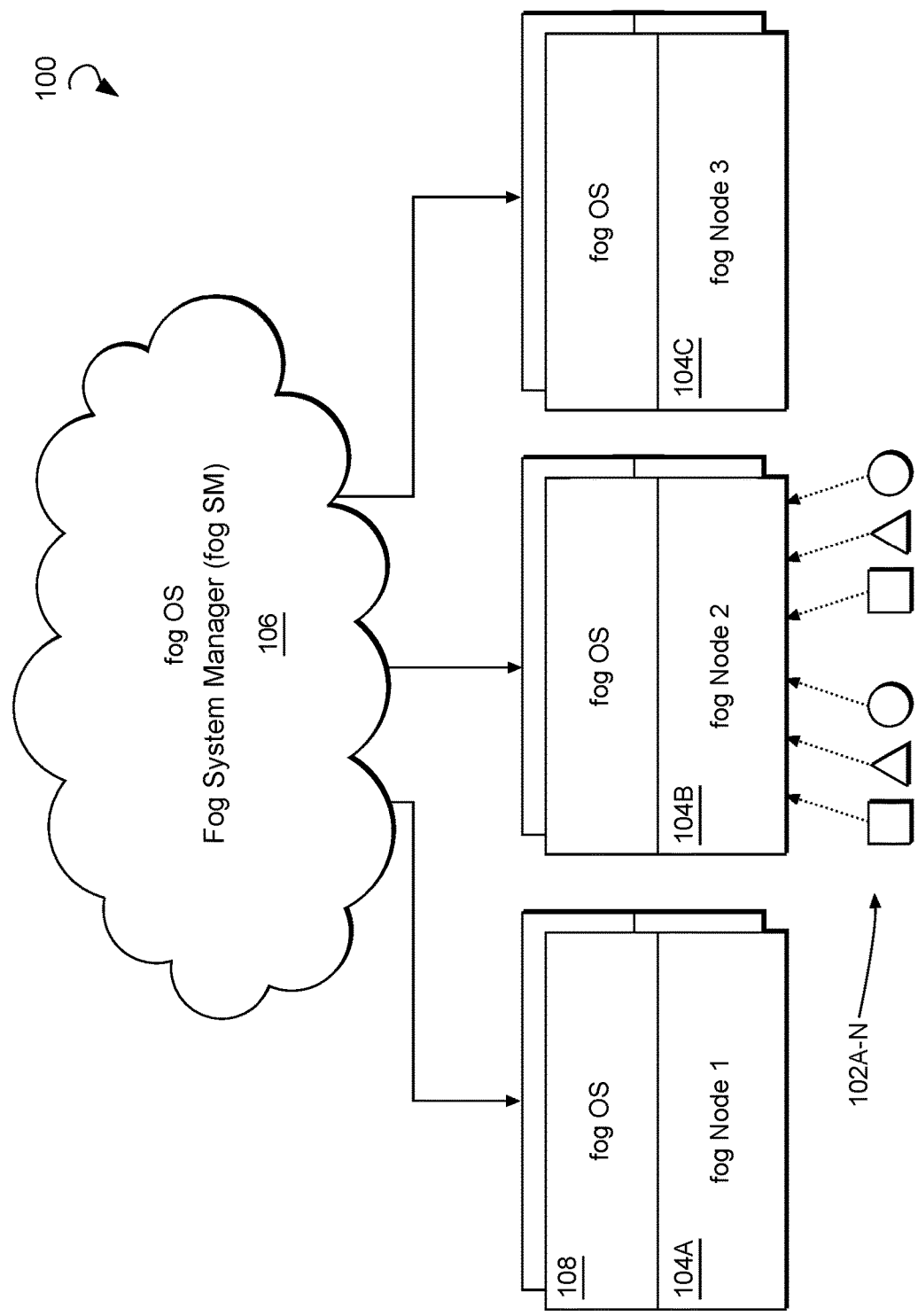
FIG. 1 is a schematic diagram of an example fog federation that secures industrial data streams according to exemplary embodiments of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Internet of Things (IoT) is the internetworking of physical devices with embedded intelligence. The Industrial Internet of Things (IIoT) is a subset of the IoT applied to industrial manufacturing, oil rigs, wind power plants, and the like. The IIoT is leading to increased automation, reduced human intervention and improved efficiency, reliability, and predictability in the control of industrial things. The IIoT is projected to lead to the fourth industrial revolution (also called Industry 4.0), which is enabling creation of new business models and exploiting big-data and real-time analytics for innovation and productivity gains.

For example, in an industrial factory, manufacturing equipment generates a large amount of raw data (e.g., terabytes of data) which needs to be collected, analyzed and collated into industrial data streams. The industrial data streams are compared, correlated, and combined with other data streams for applications including predictive maintenance, defect reduction, remote monitoring, anomaly detection, and the like. Such applications are often split into a fog/edge component and a cloud component. The split between the fog/edge component and the cloud component (i.e., distributed nature of industrial applications) creates security and privacy concerns, which are poorly addressed by existing security models. Raw industrial data comes from diverse sources, in diverse forms, and is easy to modify, which affects integrity of raw industrial data. Exemplary protocols used for raw industrial data include Open Platform Communications Unified Architecture (OPC/UA), Message Queuing Telemetry Transport (MQTT), Datagram Transport Layer Security (DTLS), and fieldbus protocols such as PROFIBUS, Modbus, PROFINET, Ethernet for Control Automation Technology (EtherCAT), Ethernet/IP, and the like. These Exemplary protocols used for raw industrial data make assigning ownership information to industrial data streams difficult in a consistent, interoperable, and unforgeable manner. Consequently, the following security problems arise for industrial data and industrial data streams.

Device identity is not defined in a unique or unforgeable manner.

Industrial data streams originating from edge devices are not checked for integrity. For example, raw industrial data originating from edge/industrial devices is not protected against manipulation by intermediary servers, proxies, and untrusted applications.

Data originating from a device is not protected. In other words, specific data association to device of origin is not protected. For example, any device may stream data from edge devices to the cloud and impersonate another device, or be subject to Man-in-the-Middle attacks.

A mechanism to verify the originator of data does not exist for a large number of devices.

Applications running on the edge do not currently solve data stream trust and integrity problems.

Sharing of data is not segmented into sharing domains.

The above exemplary security problems are impeding adoption of the IIoT because of the extreme sensitivity to data leakage in the industrial setting. The IIoT is progressing and industry is beginning to take advantage of modern data processing pipelines to get benefits of a more open and integrated supply chain, thereby increasing risk of security violations for edge data.

Existing solutions to the problems discussed above include moving data to the cloud for processing. However, from a security and data ownership standpoint moving data to the cloud is problematic for most manufacturers and equipment operators. Furthermore, moving data to the cloud is made more complex by the multi-cloud paradigm where different organizations and services are hosted on different cloud computing platforms.

Existing security mechanisms have limitations and problems. For example, centralized user/password and certificate based mechanisms may be compromised and have scaling limitations. Furthermore, ransomware attacks are recurring in an industrial setting despite existing security solutions.

Current edge platforms do not secure edge processing cleanly, and are ad-hoc and inflexible mechanisms for securing data. Furthermore, existing edge platforms leave open a wide attack surface. Moreover, problems with existing edge platforms make meeting regulatory requirements and the dynamic demands of data analysis difficult. Therefore, a clean approach is needed to solve the problems discussed above using platforms with a different paradigm.

Fog computing facilitates management of industrial devices like robots, computer numeric controlled (CNC) machines, manufacturing machines, sensors, actuators, power management devices, air handlers, coolant circulating pumps, and the like, which are collectively called operational technology (OT) devices. OT devices are present in industrial floor, power plants, oil and gas rigs, high end data centers, and the like. Many other OT devices exist and are known to a person of ordinary skill in the art.

In various embodiments a federation of fogNodes (FNs) running a fog Operation System (fog OS) configured by a fog System Manager (fog SM) is a fog federation. A fog federation also provides for a "local" distributed resource management and service orchestration on edge devices, which entails the availability of enough compute, storage, network, and security resources closer to the data sources (e.g., OT devices, controls, and the like). More details are provided by U.S. patent application Ser. No. 15/783,998, filed Oct. 13, 2017, titled "Adaptive Scheduling for Edge Devices and Networks," which is incorporated herein by reference). A fog federation is especially attractive to an industrial floor like environment, wherein producers and consumers of data are both co-located within a single roof.

In some embodiments the main constituent of a fog federation is a fogNode, which dons multiple hats depending upon a deployment model. On one hand, a fogNode could be a network gateway or a lead fogNode for a deployment. On the other hand, a fogNode could participate in a distributed asset management and monitoring solution including industrial data stream security.

For context, in various embodiments the IoT is primarily a network infrastructure that manages devices at the edge of the network (referred to as "edge devices"). A fogNode, noted above, is one element of the IoT network infrastructure that is deployed at an edge of a network (e.g., fog federation) and manages multitudes of active/passive devices at the edge (e.g., OT devices). Many of these devices at the edge are mission critical and play an important part in the continual functioning of a domain system (i.e., the IoT vertical) at the edge. Additionally, the edge devices produce industrial data streams, which need security and authentication.

Various embodiments of the present technology are systems and methods for securing an edge data processing pipeline including securing industrial data streams. In some embodiments a secure edge processing pipeline comprises a fog federation of trusted and semi-trusted (e.g., authorized third party hardware), fogNodes (FNs) running a fog Operating System (fog OS) across industrial floors. Industrial data is securely tagged and analyzed into industrial data streams comprising metadata indicating ownership, organization, tenant, dynamic role, and tag information assigned by a policy engine running on a fogNode and configured by fog system manage (fog SM).

Embodiments of the present technology using a federation of FNs running a fog OS configured by a fog SM (i.e., fog federation) work to secure data analytics from the edge to downstream (e.g., peer) edge nodes and/or to the cloud. Trust between nodes is created by a variety of mechanisms including identification based on Trusted Platform Module (TPM) (also known as ISO/IEC 11889), a Trusted Execution Environment (TEE), blockchain, and key management (KM), which are synthesized in a novel and non-obvious way by the edge processor into a trusted device identity. Trusted metadata signed by the trusted device identity is applied to an industrial data stream at ingress and egress points. Semi-trusted third party applications are supported as the inputs and outputs of third party applications that are controlled. Significantly, trust between the processing nodes is done without a frequent exchange of credential information between the edge nodes.

In various embodiments of the present technology, a fog OS running on a fogNode is placed on the industrial floor and connects to various machines and sensors (e.g., OT devices). The fogNode running fog OS receives data from these various machines and sensors and applies a trusted identity and trusted metadata to the data to form authenticated industrial data stream. The fog OS sends a named, uniquely identified, and signed data stream. For example, a named, uniquely identified, and signed data stream may be named "robodata," "AGVdata," and the like.

In various embodiments a fogNode running fog OS (purposely built to provide a chain of trust and reduce attack surface area) generates a signed token with security information as metadata. The private keys of the fogNode and of authenticated data streams never leave the box. The fog OS, which is the signer, is close to the source(s) of the industrial data streams and the fogNode running fog OS has contextual information to determine access controls, which are leveraged. For example, contextual information is the manufacturer of a machine, version of sensor, type of data generated (e.g., diagnostic vs. monitoring), and the like. In contrast, in a typical enterprise scenario a centralized cloud issues certifications for a single device and data from the device.

FIG. 1 is a schematic diagram of an example fog federation 100 that is configured and constructed in accordance with embodiments of the present disclosure. The fog federation 100 implements securing of industrial data streams in various embodiments as described herein.

In various embodiments an IoT network comprises of several types of edge devices 102A-N, such as robots, numerical control machines, actuators, sensors, vehicular devices, and the like (e.g., OT devices). The edge devices are managed by an edge device management system comprising a collection of fogNodes (e.g., fogNodes 104A-C) and a cloud hosted management element, a system manager (e.g., fog SM 106).

In various embodiments FNs run a fog OS (e.g., fog OS 108). In some embodiments a fogNode is a small chassis computing device (such as a server blade) equipped with one or more compute cards called fogLets and one or more auxiliary cards for specialized functions like I/O or storage. A fogLet comprises an integrated compute module, one or more optional vector processing units (CPU), a set of solid state storage devices, and a collection of I/O controllers used to control a rich set of I/O interfaces. The I/O interfaces of the fogLet are used for connecting edge devices like sensors, actuators, machines, robotic systems, and the like (e.g., OT devices). The fogLet hosts a modular operating system, with an integrated hypervisor capable of hosting hard real time software/applications.

In some embodiments the fogNodes 104A-C are interconnected into a network and managed by an instance of the fog SM 106 executing federation application/logic (i.e., a fog federation). Fog federation deployment is an example method used for edge device connectivity and securing industrial data streams. In some embodiments the fog federation 100 is a deployment of a collection of FNs to secure industrial data streams produced by edge devices 102A-N. The fog SM 106 comprises controller software hosted in a cloud or on a stand-alone server that manages the deployment and operation of the fog federation 100 and the associated FNs (e.g., fogNodes 104A-C), fogLets, edge devices (e.g., edge devices 102A-N), and combinations thereof.

Figure 2:
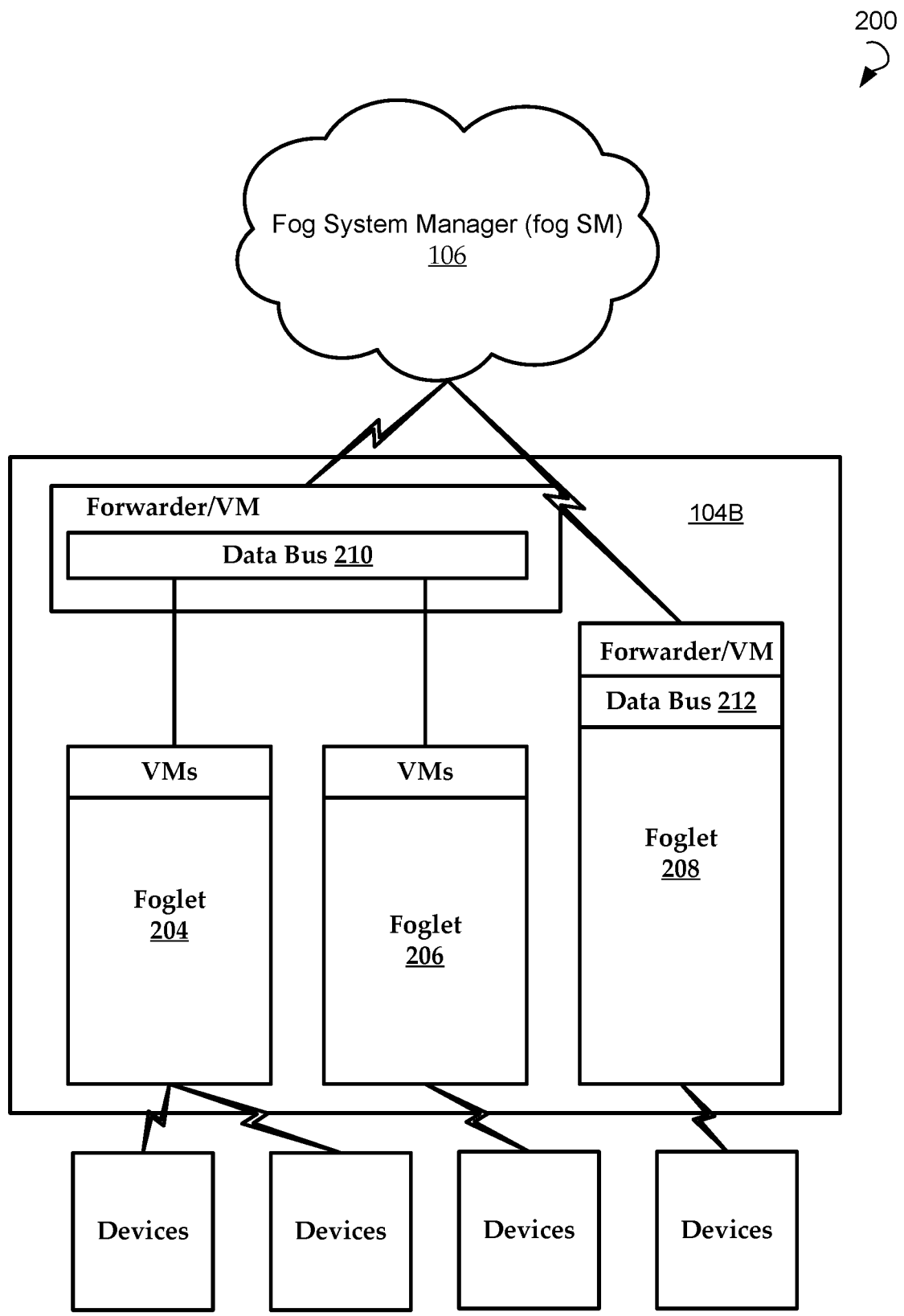
FIG. 2 is a schematic diagram of an example system architecture where multiple fogLets in a fogNode are serviced by a common data bus and forwarder, whereas other fogLets are isolated with their own data bus and forwarder according to exemplary embodiments of the present technology.

FIG. 2 is a schematic diagram of an example system architecture where multiple fogLets in a fogNode are serviced by a common data bus and forwarder, whereas other fogLets are isolated with their own data bus and forwarder, according to exemplary embodiments of the present technology. The system architecture 200 comprises a fogNode 104B which in turn comprises a fogLet and associated hardware/software infrastructure components that secure industrial data streams and enable the IT/OT device interconnection with the public cloud and their secure interoperation. (More details are provided by U.S. patent application Ser. No. 15/785,290, filed Oct. 16, 2017, titled "Enterprise Grade Security for Integrating Multiple Domains with a Public Cloud," which is incorporated herein by reference).

Exemplary architecture of a plurality of fogLets in a single fogNode is illustrated in FIG. 2 according to embodiments of the present technology. Multiple fogLets can be implemented within the fogNode 104B in some embodiments. For example, the system architecture 200 illustrates a single fogNode 104B that comprises a plurality of fogLets 204, 206, and 208. A data bus 210 can extend across fogLets 204 and 206. In one embodiment, the data bus 210 can be extended to allow fogLet 208 to be included. FogLet 208 can be separate from fogLets 204 and 206, including its own data bus 212 for additional security and separation from other fogLets on the same fogNode (e.g., fogLets 204 and 206). The plurality of fogLets 204, 206, and 208 are connected to a plurality of devices (e.g., edge devices 102A-N of FIG. 1).

In various embodiments an authenticated industrial data stream is a concrete object (Authenticated Data Stream object) that is statically or programmatically (i.e., dynamically) defined and intrinsically supports data rights and data ownership management, which are associated by a device identity engine and an authentication/authorization policy engine. For example, an Authenticated Data Stream object that originates from the edge processor, based on data from multiple types of machines and sensors (e.g., edge devices 102A-N), is signed according to a pre-defined method and is destined for one or more stakeholders (e.g., machine owners, factory owner, maintenance company, and additional stakeholders, and the like).

In various embodiments an Authenticated Data Stream object is an industrial data stream that originates on a fogNode running fog OS, which carries both statically and dynamically generated security metadata. An Authenticated Data Stream object also contains data including one or more source machines and their respective manufacturers. This information is used to derive access control policies that each manufacturer wants to associate with a respective Authenticated Data Stream.

In some embodiments composite Authenticated Data Stream objects are supported for which an analyzed Authenticated Data Stream is composed of correlation and analysis of data originating from sensors and equipment from different manufacturers at the edge, with a method for assigning data rights programmatically based on the type of analysis. The original data is not inspected or modified, but it may be combined into new Authenticated Data Streams based on their respective metadata.

In various embodiments an Authenticated Data Stream is explicitly defined by an administrator, or generated by a policy engine based on data characteristics such as volume, frequency, anomaly detection, and Artificial Intelligence (AI) models as determined by policies set by a system administrator. An administrator defined Authenticated Data Stream has explicitly associated ownership information defined by the administrator. For example, a signing certificate and the type of data inputs analyzed. A policy engine defined Authenticated Data Stream is generated based on conditions that are met by data coming from different data sources. For example, when the threshold level of data from one machine is met, such as the temperature is above 90 degrees Fahrenheit, a policy based Authenticated Data Stream is generated that has a destination based on the type of machine and an assigned maintenance organization for the machine. In either case, the Authenticated Data Stream is tagged using a set of fixed parameters and a set of dynamic parameters that may be used to make access control decisions later using flexible schemes such as Attributed Based Access Control (ABAC), Role Based Access Control (RBAC), and Context Based Access Control (CBAC), and the like.

In some embodiments an authentication root of trust is enforced by the system at both the data ingress and data egress points by tagging input and output data streams. The metadata information added includes priority information that affects the speed of processing of the data by downstream consumers.

In various embodiments the data stream ingestion is done at the edge by one or more of the following: a proxy for device protocols such as OPC/UA, Modbus, PROFINET, and the like; object code modification of existing clients running on the fog platform to call a software development kit (SDK); explicit calls to an SDK by an application writer; and sending data to a databus, and application of rules on the databus. In each of these methods, the fog security and analytics services supply authentication and edge analytics metadata to the authenticated data stream.

In various embodiments data device origination identification and ownership guarantees are based on synthesized identities for senders and recipients using hardware root of trust (e.g., TPM), software root of trust (e.g., protected KM), and distributed root of trust (e.g., blockchain). The guarantees are used to assert security information (e.g., roles, tenancy, context, tags, and the like) before sending data out from the edge.

In some embodiments a device from which data originates is assigned both an aggregate identity that comprises a source-device identity (e.g., a serial number) and one or more owner identities. The source identity identifies the hardware device. The owner identity identifies the owning organization (e.g., device manufacturer and device operator). The aggregate identity derivation is based on a chain of trust including a hardware root of trust (e.g., TPM) when available.

In various embodiments added metadata information is signed by a device identity that is based on a trusted platform. The way information is derived for the device identity is novel and nonobvious and is designed to take into account the diversity of nodes in the industrial field. Device identity is backed by a hardware root of trust (e.g., TPM), a software root of trust (e.g., protected KM), and/or a distributed root of trust (e.g., blockchain).

In some embodiments both the device identity and the owner identity are recorded in a signature, which allows for better control and estimation of the trust placed on the data originating from the edge. For example, a fogNode generates signed ownership information based on the device identity and the owner identity, which is attached as a cookie, or a JavaScript Object Notation (JSON), or eXtensible Markup Language (XML) file. This ownership information is signed by the fogNode identity. The identity may be derived by a TPM/KM/Enhanced Privacy ID (EPID) and the receiver can check the JSON Web Token (JWT) signature.

In various embodiments the root of trust is attached by tagging the data with ownership information in a secure manner at the point of data ingestion and distribution from a fogNode running fog OS.

In various embodiments attestation of downstream traffic for trusted recipients and assignment of roles to the traffic using metadata defined on a centralized data aggregator (e.g., fog SM 106). This is applicable to correlation of machine data on a large assembly line and also to a supply chain use case for secure data sharing across FNs in different plants that are working towards a common outcome. FNs that are sharing the same trust characteristics act on data received from another trusted source with minimal external intervention.

In various embodiments the present technology includes attestation of downstream traffic data streams for trusted recipients. Assignment of attested profiles including ownership information to the data stream using metadata defined in a fog SM (e.g., fog SM 106) and created on fogNodes (e.g., fogNodes 104A-C). Regardless of how the data travels from a fogNode to the recipients, basic attested ownership information travels with the data and extended attributes information is obtained from the data stream profile maintained on the fog SM. This basic and extended ownership information carries a signature that is verifiable by the recipient.

In some embodiments roles that apply to the data streams include cloud administration, machine-builder administration, machine-operator administration, machine-builder-supplier administration, factory staff, control staff, data analytics staff. These roles can be generalized into two part roles—one part identifies the originating organization, the other identifies the level of access within that organization (e.g., admin/operator/guest). All of these roles access the same data, filtered according to access privilege for each role determined by the organization and level of access. Another requirement that can be inferred is the need for incremental access. For example, a data analytics role user may need access to incremental data streams based on changing requirements.

In various embodiments when deploying an application, security is both declarative and adaptive. For example, there are a set of "tenant+organization+role+authorized recipients" combinations, the application needs access to, furthermore these are the destination Uniform Resource Locators (URLs) the application needs to talk to. The roles and URLs in this example belong to an adaptive security profile that is linked to the originating fogNode. A history of this adaptive security profile is maintained and attached to the traffic data stream. This forms an attestation history of access control that the recipient always has access.

In some embodiments types of metadata to be added to an adaptive security profile include the following. Destinations attribute including designated recipients, output data connectors, and receiving systems. Roles attribute that can be assumed by an application. Capabilities attribute that can be accessed by the application. Value attribute that is attached to the data stream, which may be used for monetization.

In various embodiments data driven methods of determining access controls relevant metadata from IIoT data. The categorization of IIoT data and the rules governing access controls definitions are complex and hard for a human to specify correctly beyond a coarse level because the value associated with data is not known in advance, the variety of connected machines, and multiple owners of the industrial data streams.

In various embodiments the solution to this idea is based on the observation that a processing node close to the machine is in the best position to analyze the data using machine learning and AI algorithms, and to come up with recommendations to determine value and apply appropriate controls on the data. Embodiments of the present technology do this semi-automatically based on a predefined adaptive grid of criteria that use edge data to categorize and create access control rules using processing power both at the edge, the fogNode, and in the cloud.

In various embodiments systems and methods of the present technology enable data driven (i.e., machine learning based) methods of determining role-based access control (RBAC) and context-based access control (CBAC) and machine-learning relevant metadata from IIoT data. Currently in an industrial automation context such as a factory floor, or in an autonomous vehicle, the various types of data cannot be categorized effectively without human intervention. For example, with RBAC, each data stream resource has to be assigned a role for access control. However, not all data streams and their analytics can be defined in advance and their access controls may not be defined. But an acceptable way of categorizing, valuing, and applying access control to data streams is required for an as-yet undefined data stream, without burdening an administrator with defining fine-grained policies by hand.

In various embodiments programmatic ways of attaching metadata from IIoT data leads to flexible assignment of roles, tags, and context information. For example, if an industrial data stream consists of video streams over a threshold size, and at a dangerous intersection location, it may be automatically tagged with a higher priority and a higher security rating and put in a queue for faster processing by a public safety organization recipient. A machine learning based classification engine or a neural network may analyze data at the edge and categorize analyzed data based on context.

In some embodiments the categorization of IoT data and the rules governing access controls definitions are complex and hard for a human to specify correctly beyond a coarse level. This is partly because the value associated with data is not known in advance, because of the wide variety of connected machines, and because of multiple owners of the industrial data streams.

In various embodiments of the present technology a processing node close to a machine producing data is done semi-automatically based on a predefined adaptive grid of criteria that use edge data to categorize and create access control rules. Processing power both at the edge, the fog, and in the cloud is used. In some embodiments methods comprise a complex event processing pipeline that determines statistics over the data at different frequencies of data collection and looks for patterns across data from multiple event sources. The complex event processing pipeline is capable of directing data collection across connected devices at different frequencies. A value analysis of the data based on pre-defined criteria is performed and comes up with recommendations of categories and access control mappings. These recommendations can be accepted or rejected by the fog system administrator.

Figure 3:
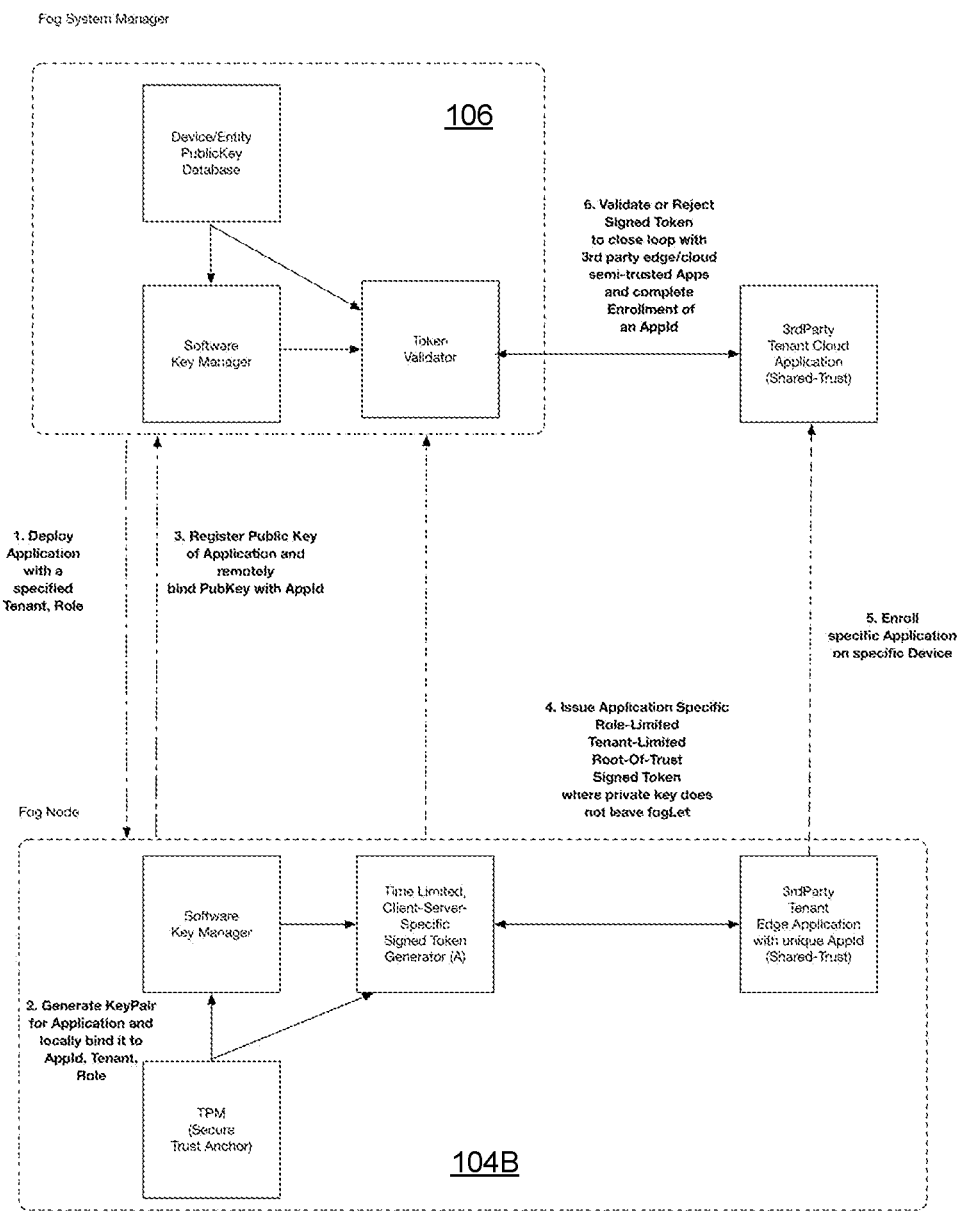
FIG. 3 is a diagram showing application identity establishment using a trusted anchor according to exemplary embodiments of the present technology.

FIG. 3 is a diagram showing application identity establishment using a trusted anchor according to exemplary embodiments of the present technology. FIG. 3 depicts a system 300 comprising a fog system manager (e.g., fog SM 106) and a fogNode (e.g., fogNode 104B). The fog SM 106 comprises device/entity public key database, a software key manager, and token validator. The fogNode 104B comprises a software key manager, TPM (i.e., secure trust anchor), a time limited client/server specific signed token generator, and a third party tenant edge application (i.e., shared trust). The time limited client/server specific signed token generator of the fogNode 104B communicates with the token validator of the fog SM 106.

The system 300 of FIG. 3 specifically comprises a signed token generator. Specifically, a time limited client/server specific signed token generator (i.e., token A) of the fogNode 104B. The third party tenant edge application (i.e., shared trust) of the fogNode 104B communicates with the time limited client/server specific signed token generator of the fogNode 104B. The system 300 of FIG. 3 further comprises a third party tenant cloud application (i.e., shared trust) that is in communication with the token validator of the fog SM 106. The third party tenant cloud application (i.e., shared trust) receives input from the third party tenant edge application (i.e., shared trust) of the fogNode 104B.

In various embodiments the fog SM 106 deploys an application with a specified role and tenant to the fogNode 104B. In some embodiments TPM (i.e., secure trust anchor) of fogNode 104B generates a key pair for the application and locally binds the key pair with the specified role and tenant.

In some embodiments the fogNode 104B registers a public key of the application using the fog SM 106 and remotely binds the public key with the application.

In various embodiments of the present technology, a trusted application on a specific device is enrolled by the following steps. The time limited client/server specific signed token generator (i.e., token A) of the fogNode 104B issues an application specific, role limited, tenant limited root of trust signed token (where the private key does not leave the fogLet) that is shared with the third party tenant edge application (i.e., shared trust) of the fogNode 104B. The third party tenant edge application (i.e., shared trust) communicates the token with the third party tenant cloud application (i.e., shared trust). In some embodiments the third party tenant edge application (i.e., shared trust) enrolls a specific application on a specific device.

In various embodiments the third party tenant cloud application (i.e., shared trust) validates the signed token using the token validator of the fog SM 106 based on device and application identities. In some embodiments the third party tenant cloud application (i.e., shared trust) rejects the signed token using the token validator of the fog SM 106 based on device and application identities. The validation or rejection of the signed token closes the loop with the third party tenant edge application (i.e., shared trust) and the third party tenant cloud application (i.e., shared trust) and completes enrollment of the application.

Figure 4:
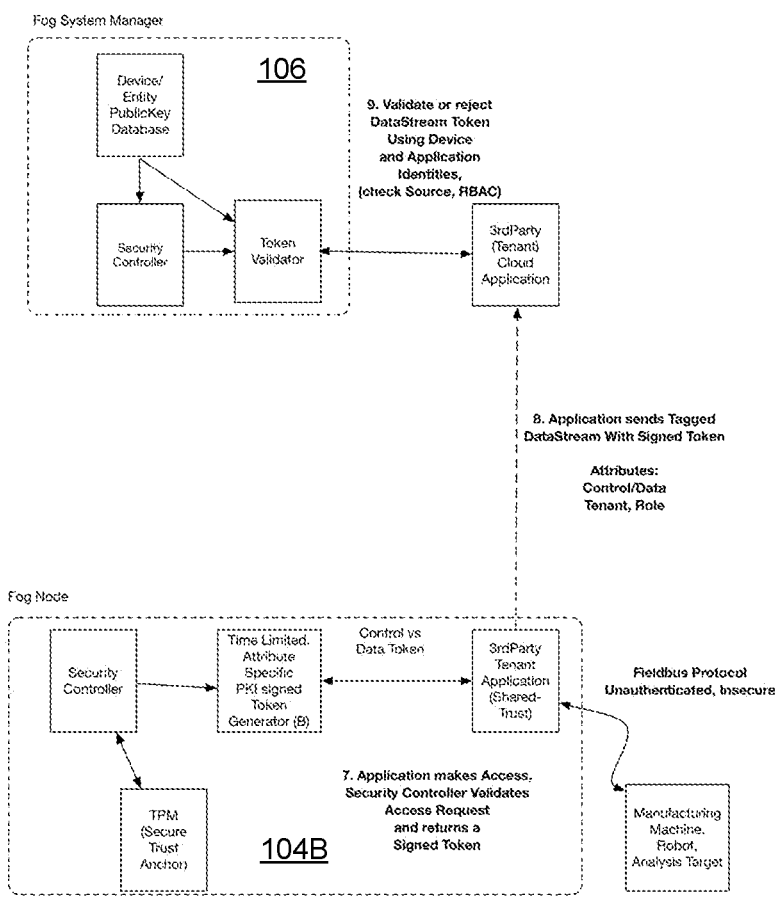
FIG. 4 is a diagram showing data stream identity and access control with attributes included in signed token (e.g., second token generator) according to exemplary embodiments of the present technology.

FIG. 4 is a diagram showing data stream identity and access control with attributes included in signed tokens (e.g., second token generator) according to exemplary embodiments of the present technology. FIG. 4 depicts a system 400 comprising a similar architecture as FIG. 4 with the addition of an attribute specific PKI signed token generator. Specifically, a time limited, attribute specific PKI signed token generator (i.e., token B) of the fogNode 104B. The system 400 of FIG. 4 further comprises an addition of manufacturing machine/robot analysis target in communication with the third party tenant application (i.e., shared trust) using an insecure protocol (e.g., fieldbus protocol) that is not authenticated.

Turing back to FIG. 4, in various embodiments the third party tenant application (i.e., shared trust) makes an access request. The security controller of the fogNode 104B validates the access request and the time limited, attribute specific PKI signed token generator (i.e., token B) of the fogNode 104B returns a signed token. In some embodiments the returned token is an access control token. In some instances the returned token is an identity token. In various embodiments the token is combinations of an access control token and an identity token.

In some embodiments the third party tenant application (i.e., shared trust) sends a tagged data stream with a signed token (e.g., the returned token) to the third party tenant cloud application (i.e., shared trust). As discussed above the returned token is an access control token and is some embodiments the returned token is an identity token.

In various embodiments the third party tenant cloud application validates the tagged data stream with the signed token (e.g., the returned token) using the device identity and the application identity using the token validator of the fog SM 106. In various embodiments the third party tenant cloud application rejects the tagged data stream with the signed token (e.g., the returned token) using the device identity and the application identity and using the token validator of the fog SM 106.

In various embodiments attributes of the tagged data stream shared by the third party tenant application include control, data, tenant, and role.

Figure 5:
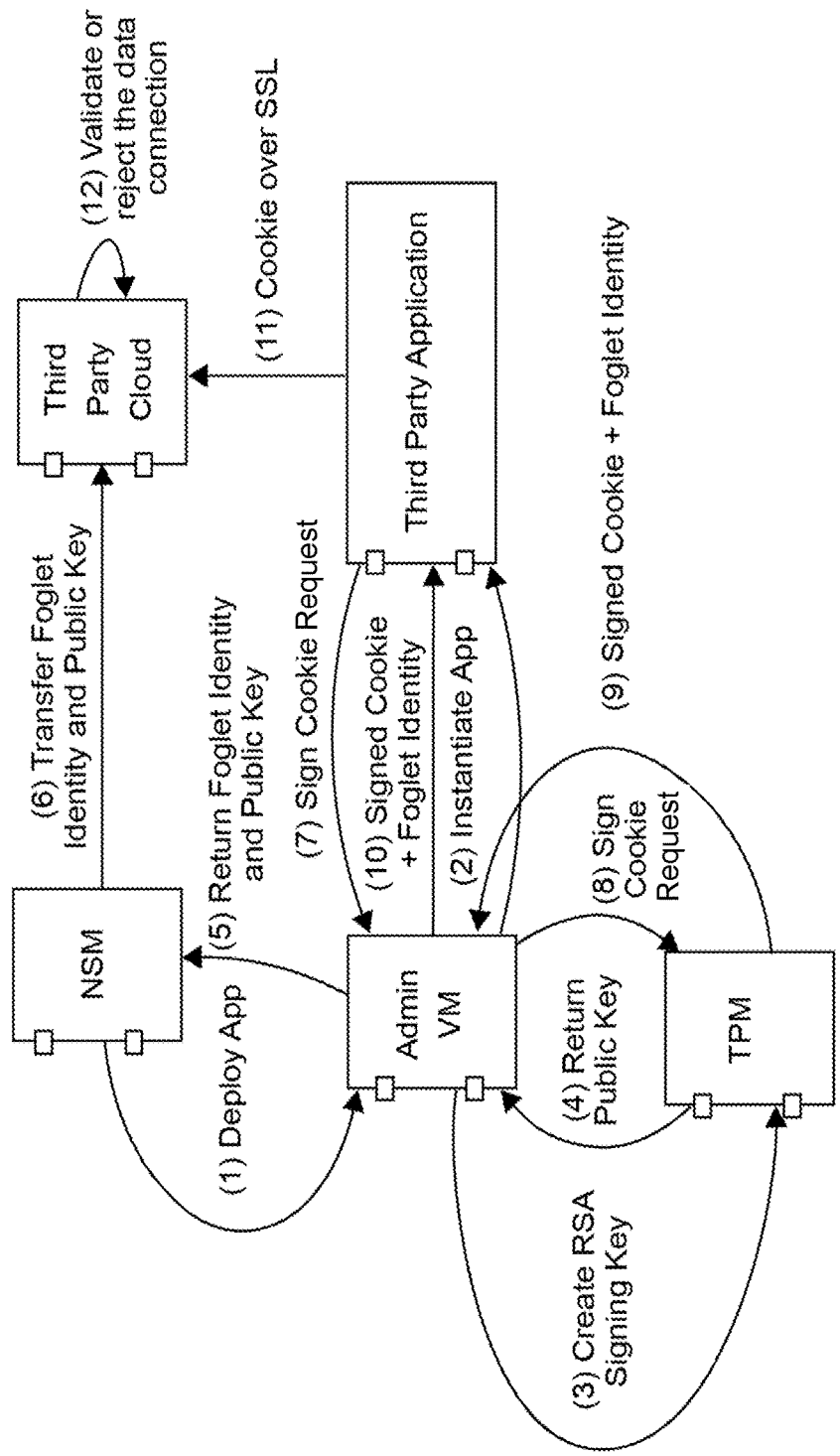
FIG. 5 is a diagram showing data authentication root of trust derivation based on hardware Trusted Platform Module (TPM), blockchain, other trust sources, and device identifiers according to exemplary embodiments of the present technology.

FIG. 5 is a diagram showing data authentication root of trust derivation based on hardware (e.g., TPM), blockchain, other trust sources, and device identifiers according to exemplary embodiments of the present technology. FIG. 5 depicts a system 500 comprising a system manager (e.g., NSM on FIG. 5) (e.g., fog SM 106), a fog virtual machine (e.g., Admin VM on FIG. 5), a root of trust in a fogNode (e.g., TPM on FIG. 5), a third party tenant application (e.g., third party application on FIG. 5) (e.g., the third party tenant application of FIG. 3 and FIG. 4.), and a third party cloud application (e.g., third party cloud on FIG. 5) (e.g., the third party tenant cloud application (i.e., shared trust) of FIG. 3 and FIG. 4.)

In various embodiments a system manager (e.g., fog SM 106) deploys an application to a fog system administration function of a fogNode (e.g., 1 deploy app on FIG. 5) using a virtual machine.

In some embodiments the fog system administration function instantiates the application to a third party application (e.g., the third party tenant application of FIG. 3 and FIG. 4.) (e.g., 2 instantiate app on FIG. 5) using a virtual machine.

In various embodiments the fog system administration function using a virtual machine creates a private signing key with a root of trust (e.g., TPM) of a fogNode. For example, the fog system administration function creates a Rivest-Shamir-Adleman (RSA) signing key (e.g., 3 create RSA signing key on FIG. 5)

In some embodiments the root of trust (e.g., TPM) of a fogNode returns a public key (e.g., 4 return public key on FIG. 5).

In various embodiments the fog system administration function returns the fogLet identity and the public key to the system manager (e.g., fog SM 106) (e.g., 5 return fogLet identity and public key on FIG. 5).

In various embodiments the system manager (e.g., fog SM 106) transfers the fogLet identity and the public key (e.g., 6 transfer fogLet identity and public key on FIG. 5) to a third party cloud application (e.g., the third party tenant cloud application (i.e., shared trust) of FIG. 3 and FIG. 4.)

In some embodiments the third party application (e.g., the third party tenant application of FIG. 3 and FIG. 4.) sends a signed authentication cookie to the fog system administration function (e.g., 7 sign cookie request on FIG. 5).

In various embodiments the fog system administration function sends the signed authentication cookie to the root of trust (e.g., TPM) (e.g., 8 sign cookie request on FIG. 5).

In some embodiments the root of trust (e.g., TPM) sends the signed authentication cookie and a fogLet identity to the fog system administration function (e.g., 9 signed cookie and fogLet identity on FIG. 5).

In various embodiments the fog system administration function sends the signed authentication cookie and the fogLet identity to the third party application (e.g., the third party tenant application of FIG. 3 and FIG. 4.) (e.g., 10 signed cookie and fogLet identity on FIG. 5).

In some embodiments the third party application (e.g., the third party tenant application of FIG. 3 and FIG. 4.) sends the authentication cookie to the third party cloud application (e.g., the third party tenant cloud application (i.e., shared trust) of FIG. 3 and FIG. 4.) using Secure Sockets Layer (SSL) (e.g., 11 cookie over SSL).

In some embodiments the third party cloud application validates a data connection (e.g., authenticated industrial data stream) based on the authentication cookie (e.g., 12 validate or reject the data connection on FIG. 5). In some instances the third party cloud application rejects a data connection (e.g., industrial data stream) based on the authentication cookie (e.g., 12 validate or reject the data connection on FIG. 5). In various embodiments validation or rejection of a data connection is based on authentication information from the fogNode and the third party application.

Figure 6:
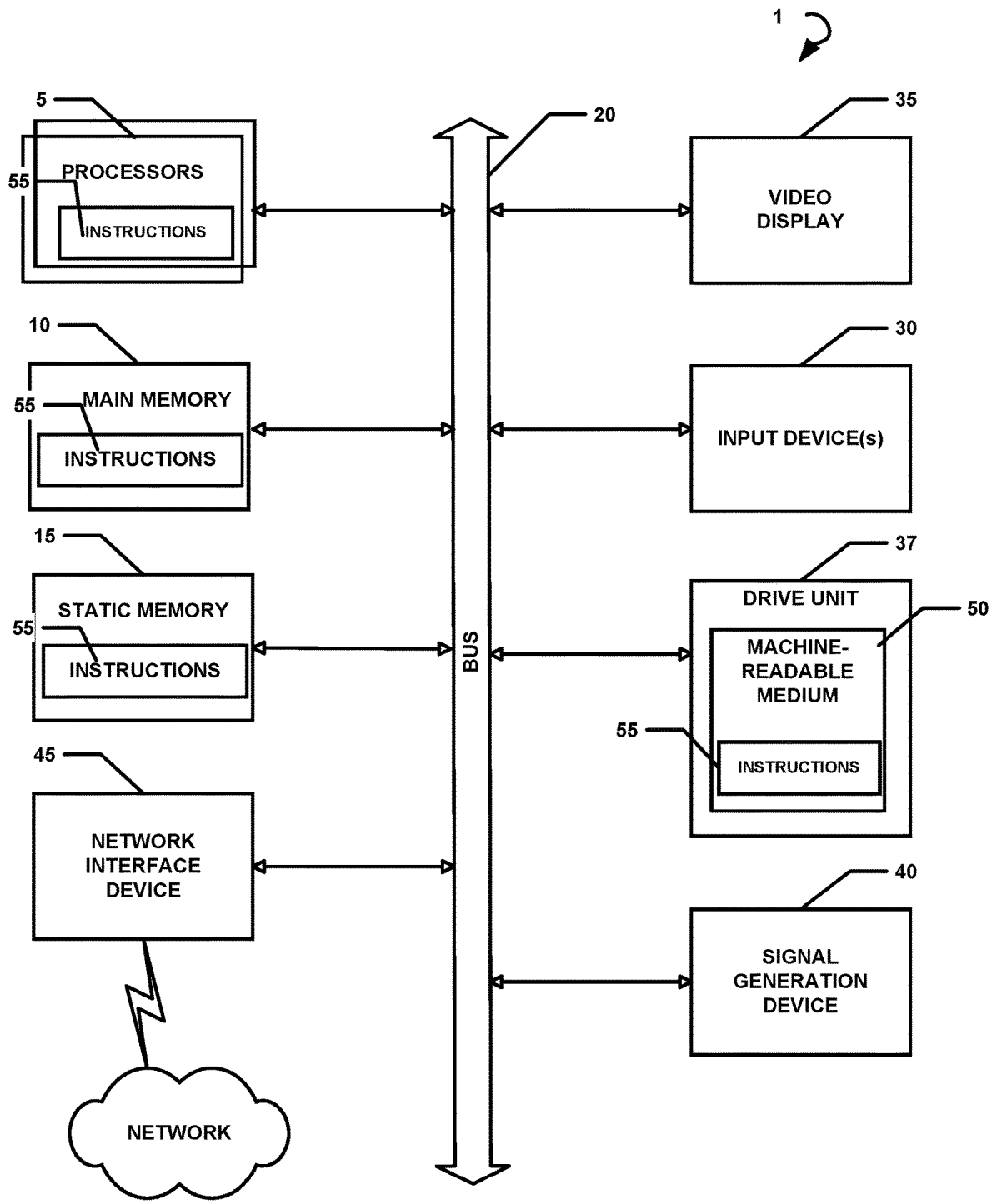
FIG. 6 illustrates a computer system for executing embodiments of the present technology.

FIG. 6 is a diagrammatic representation of an example machine in the form of a computer system 1, within which a set of instructions for causing the machine to perform any one or more of the methodologies discussed herein may be executed. In various example embodiments the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for security of industrial data streams arising from industrial applications and devices, comprising:
    provisioning a fog Node that is communicatively coupled with a fog cloud manager through a forwarder of the fog Node;
    providing a foglet within the fog Node, the foglet communicating with a plurality of operational technology devices;
    providing foglet identification information using a root of trust of the fog Node, the root of trust of the fog Node being located in the fog Node;
    providing foglet encryption information using the root of trust of the fog Node;
    communicating the foglet identification information and the foglet encryption information to the fog cloud manager;
    transferring the foglet identification information and the foglet encryption information to a third party cloud application for validation of industrial data streams from the plurality of operational technology devices;
    receiving operational device authentication information from a third party tenant application, the third party tenant application communicating with the plurality of operational technology devices;
    providing the operational device authentication information with foglet identification information using the root of trust of the fog Node; and
    communicating the operational device authentication information with the foglet identification information to the third party tenant application, the third party tenant application communicating the operational device authentication information with the foglet identification information to the third party cloud application, the third party cloud application validating the industrial data streams from the plurality of operational technology devices using the operational device authentication information and the foglet identification information.

2. The method of claim 1, further comprising:
    an offline policy engine, the offline policy engine conditionally elevating security based on analysis of the industrial data streams from the plurality of operational technology devices using a threshold for at least one of data volume of the industrial data streams, frequency of the industrial data streams, and a machine learning filter of the industrial data streams.

3. The method of claim 1, wherein the operational device authentication information comprises manufacturer identification information of the plurality of operational technology devices.

4. The method of claim 3, further comprising:
    grouping of the industrial data streams from the plurality of operational technology devices based on the manufacturer identification information of the plurality of operational technology devices.

5. The method of claim 1, wherein the root of trust of the fog Node is a hardware root of trust, the hardware root of trust being a Trusted Platform Module of the fog Node.

6. The method of claim 1, wherein the root of trust of the fog Node is a hardware root of trust, the hardware root of trust being a Trusted Platform Module located in the foglet.

7. The method of claim 5, wherein the providing of the foglet encryption information comprises the fog Node generating a private signing key with the Trusted Platform Module of the fog Node.

8. The method of claim 7, wherein the providing of the foglet encryption information further comprises the Trusted Platform Module of the fog Node returning a public key to a virtual machine of the fog Node.

9. The method of claim 1, wherein the operational device authentication information from the third party tenant application comprises a signed authentication cookie.

10. The method of claim 1, wherein the providing of the foglet encryption information comprises the fog Node providing a private signing key with the Trusted Platform Module of the fog Node.

11. The method of claim 1, wherein the foglet identification information using the root of trust of the fog Node comprises a time limited, client server specific signed token.

12. The method of claim 11, wherein the validation of the industrial data streams from the plurality of operational technology devices comprises validation of the time limited, client server specific signed token by a token validator of the fog cloud manager.

13. The method of claim 1, wherein the foglet identification information using the root of trust of the fog Node comprises:
    a first time limited, client server specific signed identity token, the identity token comprising foglet identification information for the validating of the industrial data streams from the plurality of operational technology devices; and
    a second time limited, client server specific signed access control token, the access control token comprising a timestamp and metadata attributes.

14. The method of claim 13, wherein the validation of the industrial data streams from the plurality of operational technology devices comprises validation of the first time limited, client server specific signed identity token and the second time limited, client server specific signed access control token by a token validator of the fog cloud manager.

* * * * *